US008358724B2

(12) United States Patent
Tong (10) Patent No.: US 8,358,724 B2
(45) Date of Patent: Jan. 22, 2013

(54) RADIO COMMUNICATION APPARATUS AND CONTROL METHOD

(75) Inventor: Fangwei Tong, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 153 days.

(21) Appl. No.: 13/059,610

(22) PCT Filed: Aug. 21, 2009

(86) PCT No.: PCT/JP2009/064657
§ 371 (c)(1),
(2), (4) Date: Feb. 17, 2011

(87) PCT Pub. No.: WO2010/021379
PCT Pub. Date: Feb. 25, 2010

(65) Prior Publication Data
US 2011/0134989 A1   Jun. 9, 2011

(30) Foreign Application Priority Data
Aug. 22, 2008  (JP) .................................. 2008-214019

(51) Int. Cl.
H04B 7/10 (2006.01)
(52) U.S. Cl. ....... 375/347; 375/144; 375/148; 455/13.3; 706/24
(58) Field of Classification Search .................. None
See application file for complete search history.

(56) References Cited

FOREIGN PATENT DOCUMENTS

| JP | 2001-203619 A | 7/2001 |
|----|---------------|--------|
| JP | 2001-345744 A | 12/2001 |
| JP | 2002-261669 A | 9/2002 |
| WO | 98/23043 A1 | 5/1998 |

OTHER PUBLICATIONS

International Search Report dated Nov. 17, 2009 issued by the Japanese Patent Office for International Application No. PCT/JP2009/064657.

Primary Examiner — David C. Payne
Assistant Examiner — Adolf Dsouza
(74) Attorney, Agent, or Firm — Procopio, Cory, Hargreaves & Savitch LLP (57) ABSTRACT

A radio base station according to the present invention is equipped with a determination unit that compares a first signal quality of a first output signal which is output by an adaptive array antenna and a second signal quality of a second output signal which is output by an adaptive equalizer and determines whether the improvement effect of the second signal quality with respect to the first signal quality is below expectation. When the determination unit determines that the improvement effect is below expectation, a controller stops power supply to the adaptive equalizer and the calculation of an equalization weight by a weight calculator, and outputs the first output signal as the output signal of a receiver.

7 Claims, 5 Drawing Sheets

FIG. 5

RADIO COMMUNICATION APPARATUS AND CONTROL METHOD

TECHNICAL FIELD

The present invention relates to a radio communication apparatus and a control method for executing radio communications adapted to a radio communication environment.

BACKGROUND ART

In general, the state of a radio signal received by a radio communication apparatus changes depending on a radio communication environment. For example, the radio signal may include a desired signal from a radio communication apparatus on a transmission side (hereinafter, a transmission side radio communication apparatus) and an interference signal from an interference source. Furthermore, when multiple signal propagation paths are formed, the desired signal may include an advancing wave component (for example, a direct wave component) and delay wave components which are delayed from the advancing wave component.

There is known a radio communication apparatus that includes a receiver having a configuration in which an adaptive array antenna and an adaptive equalizer are serially connected to achieve radio communications adapted to such radio communication environment (e.g., see patent document 1).

The adaptive array antenna has multiple antenna elements and cancels the interference signal contained in the radio signal received by the antenna elements according to an antenna weight. The adaptive equalizer combines the advancing wave component and the delay wave components according to an equalization weight. The antenna weight and the equalization weight (hereinafter abbreviated as "weight" as needed) are calculated by a weight calculator provided to the receiver.

As described above, in the radio communication environment including a delay wave (a delay wave component), the receiver having the configuration in which the adaptive array antenna and the adaptive equalizer are serially connected can maximally improve the signal quality of the received radio signal in such a manner that the adaptive array antenna cancels the interference signal and the adaptive equalizer combines the delay wave components.

CITATION LIST

Patent Document

Patent Document 1: Japanese Patent Application Publication No. 2002-261669 (paragraphs [0013] to [0040] and FIG. 1)

SUMMARY OF THE INVENTION

However, the receiver in which the adaptive array antenna and the adaptive equalizer are serially connected has the following problems, if the adaptive equalizer keeps operating under the radio communication environment including no delay wave (or including almost no delay wave).

Specifically, the problem is that power consumption of the receiver increases unnecessarily because power is consumed by the equalization processing in the adaptive equalizer and the calculation in the weight calculator.

In addition, the antenna weight set in the adaptive array antenna and the equalization weight set in the adaptive equalizer affect each other. Accordingly, the calculation in the weight calculator is complicated and it is also difficult to converge the antenna weight and the equalization weight to optimum values (hereinafter, optimum weights). The signal quality of the received radio signal rather deteriorates when the weights cannot be converged to optimum weights.

For this reason, an objective of the present invention is to provide a radio communication apparatus and a control method which, using a receiver having such a configuration that an adaptive array antenna and an adaptive equalizer are serially connected, are capable of reducing power consumption of the receiver without deteriorating the signal quality of a radio signal received by the receiver, and of easily and properly calculating weights.

In order to solve the problems described above, the present invention has the following features. According to a first feature of the present invention, there is provided a radio communication apparatus (e.g. a radio base station 100) comprising: a receiver (receiver 101) configured to receive a radio signal containing a desired signal from a transmission side radio communication apparatus (e.g. a radio terminal 200) and an interference signal from an interference source (e.g. a radio terminal 210 and a radio base station 300); and a controller (a controller 160) configured to control the receiver, wherein the receiver comprises: an adaptive array antenna (an adaptive array antenna 110) which has a plurality of antenna elements (antenna elements $ANT_1$ to $ANT_R$) and is configured to cancel the interference signal contained in the radio signal received by the antenna elements according to an antenna weight (an antenna weight w* (*: a complex conjugate)), an adaptive equalizer (an adaptive equalizer 120) configured to combine an advancing wave component and a delay wave component, which are contained in a first output signal (a first output signal $y_1[k]$) outputted from the adaptive array antenna, according to an equalization weight (an equalization weight c* (*: a complex conjugate)), the delay wave component delayed from the advancing wave component, and a weight calculator (a weight calculator 140) configured to calculate the antenna weight set in the adaptive array antenna and the equalization weight set in the adaptive equalizer, wherein a second output signal (a second output signal $y_2[k]$) outputted by the adaptive equalizer is outputted as an output signal (an output signal Out) of the receiver, the radio communication apparatus further comprising: a determination unit (a determination unit 150) configured to compare a first signal quality of the first output signal with a second signal quality of the second output signal to determine whether an improvement effect of the second signal quality with respect to the first signal quality is equal to or smaller than a desired level, wherein when the determination unit determines that the improvement effect is equal to or smaller than the desired level, the controller stops power supply to the adaptive equalizer and calculation of the equalization weight in the weight calculator and causes the first output signal to be outputted as the output signal of the receiver.

According to the radio communication apparatus as described above, when the determination unit determines that the improvement effect is equal to or smaller than the desired level, the controller stops the power supply to the adaptive equalizer and the calculation of the equalization weight in the weight calculator and causes the first output signal to be outputted as an output signal of the receiver. Consequently, the power consumption of the receiver is reduced and the weight can be easily and properly calculated without deteriorating the signal quality of the radio signal received by the receiver.

In the first feature, the determination unit may determine whether the first signal quality deteriorates after the controller stops the power supply, and when the determination unit determines that the first signal quality deteriorates, the controller may restart the power supply and the calculation of the equalization weight in the weight calculator and may cause the second output signal to be outputted as the output signal of the receiver.

In the first feature, the weight calculator may alternately calculate the antenna weight to improve the first signal quality and the equalization weight to improve the second signal quality, and when the controller stops the calculation of the equalization weight in the weight calculator, the weight calculator may only repeat the calculation of the antenna weight depending on the first signal quality.

In the first feature, the radio communication apparatus may further comprise an error calculator (subtracters 131 and 132) configured to calculate a first error (an error signal $e_2[k]$) between the first output signal and a reference signal (a reference signal $d[k]$) set in advance, and a second error (an error signal $e_1[k]$) between the second output signal and the reference signal, wherein the first signal quality is a value based on the first error and the second signal quality is a value based on the second error.

In the first feature, the receiver may include an output selector (a switch SW1) configured to select any one of the first output signal and the second output signal as the output signal of the receiver, the output selector may select the second output signal as the output signal of the receiver in an initial state, and when the determination unit determines that the improvement effect is equal to or smaller than the desired level, the controller may cause the output selector to select the first output signal as the output signal of the receiver.

According to a second feature of the present invention, there is provided a control method for a radio communication apparatus including: a receiver configured to receive a radio signal containing a desired signal from a transmission side radio communication apparatus and an interference signal from an interference source, in which the receiver includes: an adaptive array antenna which has a plurality of antenna elements and is configured to cancel the interference signal contained in the radio signal received by the antenna elements according to an antenna weight, an adaptive equalizer configured to combine an advancing wave component and a delay wave component, which are contained in a first output signal outputted from the adaptive array antenna, according to an equalization weight, the delay wave component delayed from the advancing wave component, and a weight calculator configured to calculate the antenna weight set in the adaptive array antenna and the equalization weight set in the adaptive equalizer, and a second output signal outputted by the adaptive equalizer is outputted as an output signal of the receiver, the control method comprising the steps of: determining whether an improvement effect of the second signal quality with respect to the first signal quality is equal to or smaller than a desired level by comparing a first signal quality of the first output signal with a second signal quality of the second output signal (steps S102 and S103); and stopping power supply to the adaptive equalizer and calculation of the equalization weight in the weight calculator and causing the first output signal to be outputted as the output signal of the receiver when the improvement effect is determined to be equal to or smaller than the desired level in the determining (step S105).

According to a third feature of the present invention, there is provided a radio communication apparatus (e.g. a radio base station 100) comprising: a receiver (receiver 101) configured to receive a radio signal containing a desired signal from a transmission side radio communication apparatus (e.g. a radio terminal 200) and an interference signal from an interference source (e.g. a radio terminal 210 and a radio base station 300); and a controller (a controller 160) configured to control the receiver, wherein the receiver comprises: an adaptive array antenna (an adaptive array antenna 110) which has a plurality of antenna elements (antenna elements $ANT_1$ to $ANT_R$) and is configured to cancel the interference signal contained in the radio signal received by the antenna elements according to an antenna weight (antenna elements $ANT_1$ to $ANT_R$), and an error correction unit (an error correction unit 170) configured to correct a transmission error contained in a first output signal (an input signal In) outputted by the adaptive antenna array, wherein a second output signal (an output signal Out) outputted by the error correction unit is outputted as an output signal of the receiver, the radio communication apparatus further comprising: a determination unit (a determination unit 150) configured to compare a first signal quality of the first output signal with a second signal quality of the second output signal to determine whether an improvement effect of the second signal quality with respect to the first signal quality is equal to or smaller than a desired level, wherein when the determination unit determines that the improvement effect is equal to or smaller than the desired level, the controller stops power supply to the error correction unit and causes the first output signal to be outputted as the output signal of the receiver.

The present invention can provide a radio communication apparatus and a control method that can reduce the power consumption of the receiver and easily and properly calculate the weight without deteriorating the signal quality of the radio signal received by the receiver when the receiver having the configuration in which the adaptive array antenna and the adaptive equalizer are serially connected.

DESCRIPTION OF EMBODIMENTS

Next, a radio communication system according to an embodiment of the present invention will be described with reference to the drawings. Specifically, descriptions will be given of (1) a schematic configuration of the radio communication system, (2) a configuration of a radio communication apparatus, (3) an operation of the radio communication apparatus, (4) advantageous effects, and (5) other embodiments.

In the following descriptions of the drawings in the embodiments, the same or similar reference numerals are given to the same or similar parts.

(1) Schematic Configuration of Radio Communication System

Figure 1:
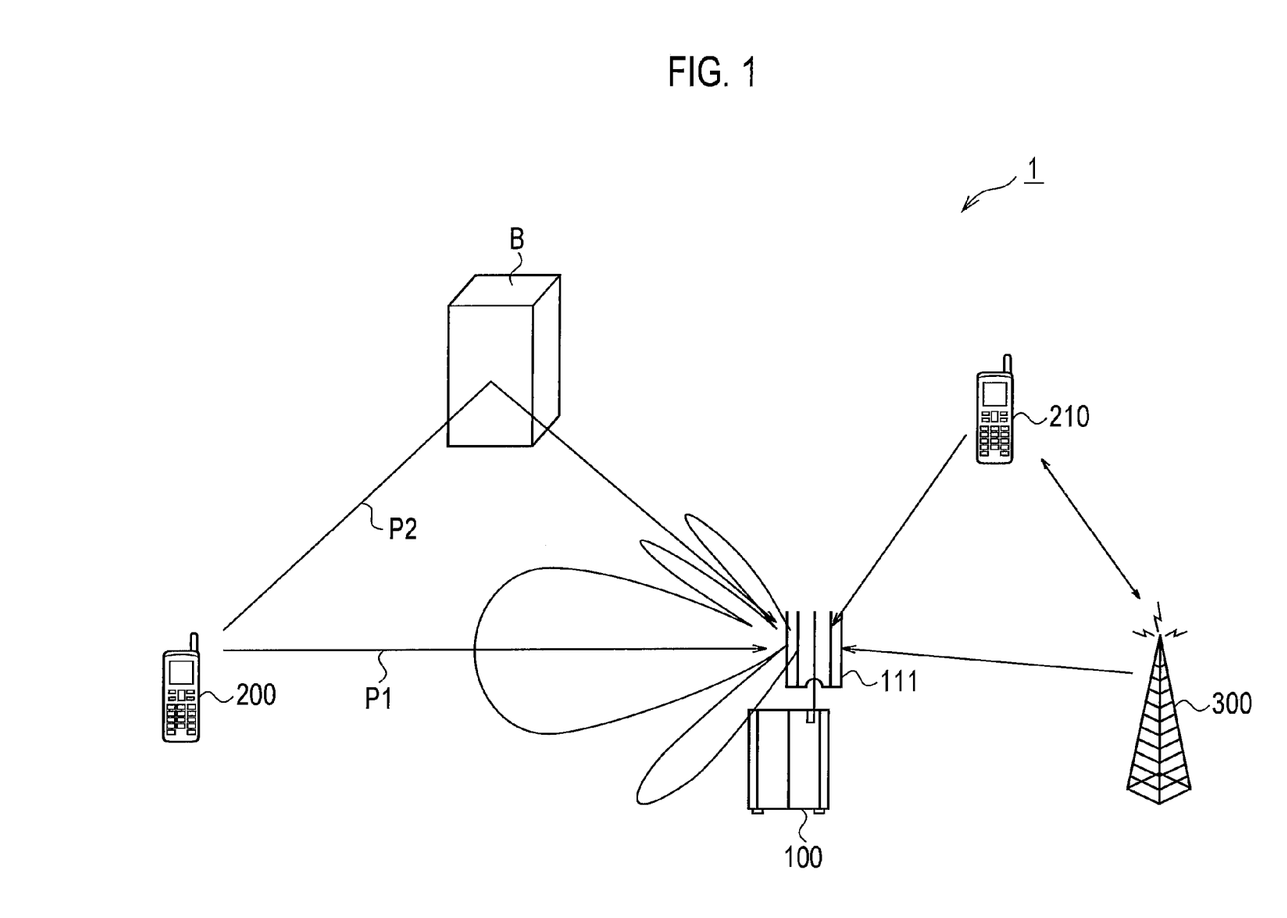
FIG. 1 is a schematic configuration diagram of a radio communication system according to an embodiment of the present invention.

FIG. 1 is a schematic configuration diagram of a radio communication system 1 including a radio base station 100 as the radio communication apparatus according to this embodiment.

As shown in FIG. 1, the radio base station 100 executes radio communications with a radio terminal 200. The radio base station 100 receives a desired signal which is transmitted by the radio terminal 200. In other words, in this embodiment, the radio terminal 200 is a transmission side radio communication apparatus which transmits a desired signal to the radio base station 100.

The radio communication system 1 further includes a radio terminal 210 and a radio base station 300. The radio base station 300 and the radio terminal 210 execute radio communications in accordance with the scheme same as or different from that of the communications executed by the radio base station 100 and the radio terminal 200.

The radio base station 300 and the radio terminal 210 also radiate radio signals. This means that the radio base station 100 also receives interference signals from the radio terminal 300 and the radio terminal 210 together with a desired signal from the radio terminal 200. In other words, in the present embodiment, the radio base station 300 and the radio terminal 210 are interference sources which transmit interference signals to the radio base station 100.

The radio base station 100 includes an array antenna 111 and performs adaptive array control using the array antenna 111. Specifically, the radio base station 100 communicates with the radio terminal 200 by steering the directivity of the array antenna 111 to the arrival direction of the desired signal from the radio terminal 200. The radio base station 100 performs null-steering to the directions of the radio terminal 210 and the radio base station 300 so that the directivity of the array antenna 111 is lowered, thereby lowering an antenna gain with respect to the interference signals from the radio terminal 210 and the radio base station 300.

In the example of FIG. 1, a desired signal transmitted by the radio terminal 200 is received by the radio base station 100 through a path P1 through which the desired signal directly arrives at the radio base station 100 and a path P2 through which the desired signal arrives at the radio base station 100 after being reflected by a building B, for example.

In other words, the desired signal that the radio base station 100 receives through the path P1 is an advancing wave (a direct wave). The desired signal that the radio base station 100 receives through the path P2 is a delay wave. Due to the delay wave, the desired signal that the radio base station 100 receives contains an advancing wave component and a delay wave component. For this reason, the radio base station 100 performs adaptive equalization processing to correct (equalize) a signal distortion caused by the delay wave component by means of combining the advancing wave component and the delay wave component.

The adaptive array control and the adaptive equalization processing may use an optimization algorithm based on the minimum mean squared error (MMSE) standard such as an algorithm based on LMS (Least Mean Square) or RLS (Recursive Least-Squares). In this optimization algorithm, the weights to be used for the adaptive array control and adaptive equalization processing are repeatedly calculated and updated, thereby being converged to an optimum weight.

For example, the desired signal transmitted by the radio terminal 200 includes an already-known signal sequence (hereinafter, an already-known signal). This already-known signal is also referred to as a training sequence. The radio base station 100 stores in advance a reference signal of a signal sequence equivalent to that of the already-known signal. The radio base station 100 repeatedly calculates the weight to minimize an error between the already-known signal and the reference signal, thereby achieving communications adapted to the radio communication environment.

(2) Configuration of Radio Communication Apparatus

Figure 2:
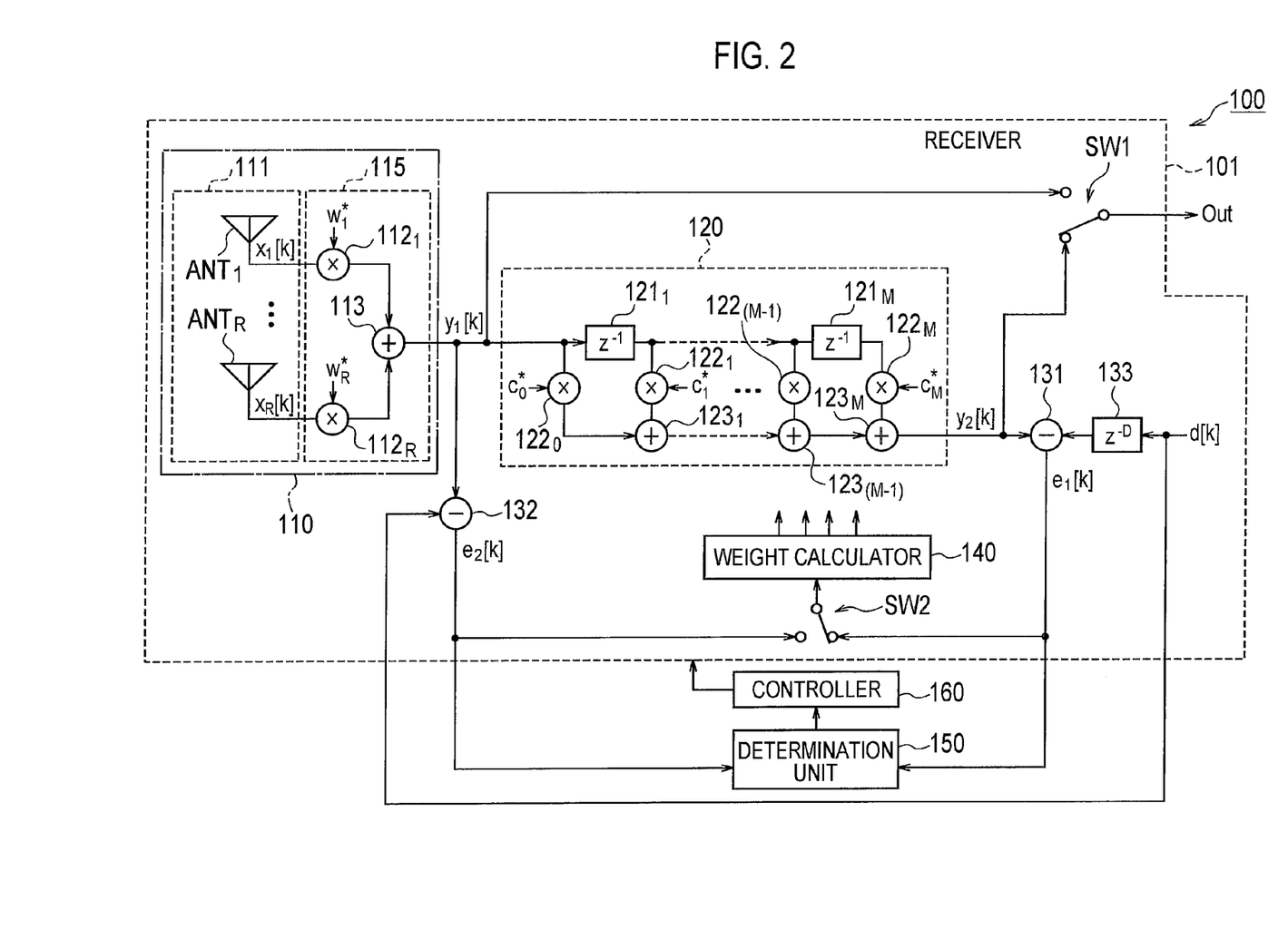
FIG. 2 is a functional block diagram of a radio base station as the radio communication apparatus according to the embodiment of the present invention.

Next, the configuration of the radio base station 100 which is a radio communication apparatus according to this embodiment is described. FIG. 2 is a functional block diagram of the radio base station 100. Note that the description is mainly given below of the configuration with regard to the configuration relating to the present invention.

As shown in FIG. 2, the radio base station 100 includes a receiver 101, a determination unit 150, and a controller 160. The receiver 101 receives a radio signal containing a desired signal from the radio terminal 200 and interference signals from the ratio terminal 210 and the radio base station 300 and outputs a result of receiving and processing the radio signal as an output signal Out. The controller 160 controls the receiver 101 based on the determination result made by the determination unit 150. Note that power is supplied from a power supply unit which is not shown to each functional block shown in FIG. 2.

The receiver 101 includes an adaptive array antenna 110, an adaptive equalizer 120, a subtracter 131, a subtracter 132, a delay element 133, a weight calculator 140, a switch SW1, and a switch SW2.

The adaptive array antenna 110 has multiple antenna elements $ANT_1$ to $ANT_R$ and suppresses an interference signal contained in radio signals received by the antenna elements $ANT_1$ to $ANT_R$ (hereinafter, received signals) depending on an antenna weight w* (*: a complex conjugate).

The adaptive array antenna 110 has the antenna array 111 including the antenna elements $ANT_1$ to $ANT_R$ and an antenna weighting unit 115 configured to perform weighting processing using the antenna weight w*.

The antenna weighting unit 115 adjusts a phase and amplitude of the received signals $x_1[k]$ to $x_R[k]$ of the array antenna 111 depending on the antenna weight w*, where "k" shows a discrete time or the number of repeating calculations in the weight calculator 140. The antenna weight w* includes multiple weight values $w^*_1$ to $w^*_R$. The weight values $w^*_1$ to $w^*_R$ are complex coefficients for adjusting the phase and amplitude of the received signal.

The antenna weighting unit 115 has complex multipliers $112_1$ to $112_R$ and an adder 113. The complex multipliers $112_1$ to $112_R$ are provided to the antenna elements $ANT_1$ to $ANT_R$, respectively. The complex multipliers $112_1$ to $112_R$ perform multiplication of the received signals $x_1[k]$ to $x_R[k]$ and the respective weight values $w^*_1$ to $w^*_R$. The multiplication, i.e., the weighting of the antenna weights $w^*_1$ to $w^*_R$ allows the control of the amplitude and phase of the received signals $x_1[k]$ to $x_R[k]$. The adder 113 is connected to outputs of the complex multipliers $112_1$ to $112_R$. The adder 113 creates a first output signal $y_1[k]$ by combining the received signals $x_1[k]$ to $x_R[k]$ respectively weighted by the complex multipliers $112_1$ to $112_R$.

The adaptive equalizer 120 is connected to an output of the adaptive array antenna 110. The adaptive equalizer 120 combines the advancing wave component contained in the first output signal $y_1[k]$ and the delay wave component contained in the first output signal $y_1[k]$ and delays from the advancing wave component, both of which are outputted by the adaptive array antenna 110, depending on an equalization weight c* (*: a complex conjugate). Specifically, the adaptive equalizer 120 executes adaptive equalization processing to adjust the phase and amplitude of the delayed first output signal $y_1[k]$ depending on an equalization weight c* (*: a complex conjugate) by delaying the first output signal $y_1[k]$ of the antenna weighting unit 115 for multiple times.

The equalization weight c* includes multiple weight values $c^*_0$ to $c^*_M$ and is also referred to as a tap coefficient. The weight values $c^*_o$ to $c^*_M$ are complex conjugates to adjust the phase and amplitude of the first output signal $y_1[k]$. The adaptive equalizer 120 is configured as an FIR (Finite Impulse Response) filter and includes delay elements $121_1$ to $121_M$, complex multipliers $122_0$ to $122_M$, and adders $123_1$ to $123_M$. The delay elements $121_1$ to $121_M$ are serially connected and delay the first output signal $y_1[k]$. The complex multipliers $122_0$ to $122_M$ multiply output signals from the delay elements $121_1$ to $121_M$ by the weight values $c^*_0$ to $c^*_M$. The adders $123_1$ to $123_M$ combine the output signals from the complex multipliers $122_0$ to $122_M$ so as to create a second output signal $y_2[k]$.

The first output signal $y_1[k]$ and the second output signal $y_2[k]$ are input to the switch SW1. The switch SW1 is controlled by the controller 160 and outputs any one of the first output signal $y_1[k]$ and the second output signal $y_2[k]$ as an output signal Out. In other words, in this embodiment, the switch SW1 constitutes an output selector. The switch SW1 selects the second output signal $y_2[k]$ as an output signal Out in the initial state.

The subtracter 131 calculates an error signal $e_1[k]$ (a second error) showing a difference between the second output signal $y_2[k]$ and the reference signal d[k]. The reference signal d[k] is held in a reference signal holder which is not shown and is input to the subtracter 131 after being delayed in the delay element 133. The error signal $e_1[k]$ that the subtracter 131 outputs is input to the switch SW2 and the determination unit 150.

The subtracter 132 calculates an error signal $e_2[k]$ (a first error) showing a difference between the first output signal $y_1[k]$ and the reference signal d[k]. The error signal $e_2[k]$ that the subtracter 132 outputs is input to the switch SW2 and the determination unit 150. In this embodiment, the subtracter 131 and the subtracter 132 constitute an error calculator.

The switch SW2 is controlled by the controller 160 and inputs any one of the error signal $e_1[k]$ and the error signal $e_2[k]$ to the weight calculator 140. The switch SW2 has already input the error signal $e_1[k]$ to the weight calculator 140 in the initial state.

The weight calculator 140 is controlled by the controller 160 and calculates the antenna weight w* set for the adaptive array antenna 110 and the equalization weight c* set for the adaptive equalizer 120 based on the error signal $e_1[k]$ or the error signal $e_2[k]$ by using the optimization algorithm.

Specifically, when the error signal $e_1[k]$ is inputted, the weight calculator 140 alternately calculates an antenna weight w* and an equalization weight c* which decrease the error signal $e_1[k]$ (a specific example is a square error $e_1^2[k]$). When the error signal $e_2[k]$ is input, the weight calculator 140 omits the calculation of the equalization weight c* and only repeats the calculation of the antenna weight w* which decreases the error signal $e_2[k]$ (a specific example is a square error $e_1^2[k]$).

The determination unit 150 compares a signal quality of the first output signal $y_1[k]$ (hereinafter, a first signal quality) with a signal quality of the second output signal $y_2[k]$ (hereinafter, a second signal quality). According to the comparison result, the determination unit 150 determines whether an improvement effect of the second signal quality with respect to the first signal quality (hereinafter simply referred to as "improvement effect") is equal to or smaller than a desired level.

In this embodiment, the error signal $e_2[k]$ is set as an index for the signal quality of the first output signal $y_1[k]$. As the error signal $e_2[k]$ becomes smaller the signal quality of the first output signal $y_1[k]$ is more improved. Similarly, the error signal $e_1[k]$ is set as an index for the signal quality of the second output signal $y_2[k]$. As the error signal $e_1[k]$ becomes smaller the signal quality of the second output signal $y_2[k]$ is more improved.

When the determination unit 150 determines that the improvement effect is equal to or smaller than the desired level, the controller 160 stops the power supply to the adaptive equalizer 120 and the calculation of the equalization weight c* in the weight calculator 140 and causes the switch SW1 to output the first output signal $y_1[k]$ as an output signal Out of the receiver 101. When the power supply to the adaptive equalizer 120 is stopped, the operation of the adaptive equalizer 120 is stopped.

After the controller 160 stops the power supply to the adaptive equalizer 120, the determination unit 150 determines whether the first signal quality deteriorates. When the determination unit 150 determines that the first signal quality deteriorates, the controller 160 restarts the power supply to the adaptive equalizer 120 and the calculation of the equalization weight c* in the weight calculator 140 and causes the switch SW1 to output the second output signal $y_2[k]$ as an output signal Out. When the power supply to the adaptive equalizer 120 is restarted, the operation of the adaptive equalizer 120 is restarted.

(3) Operation of Radio Communication Apparatus

Figure 3:
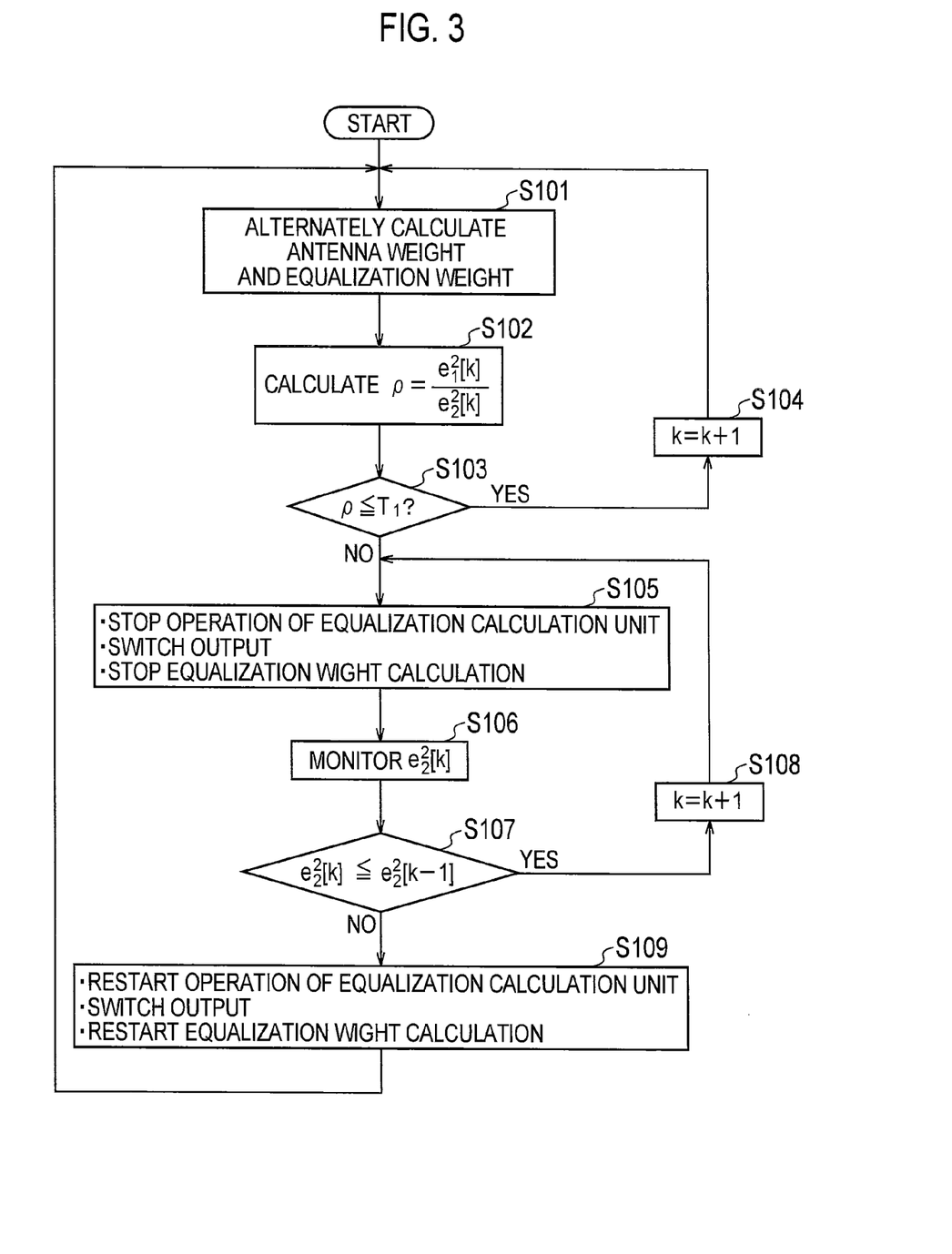
FIG. 3 is a flowchart showing the operation of the radio base station which as the radio communication apparatus according the embodiment of the present invention.

Next, the operation of the radio base station 100 which is the radio communication apparatus according to this embodiment is described. FIG. 3 is a flowchart showing the operation of the radio base station 100.

In the initial stage of the operation, the weight calculator 140 alternately calculates an antenna weight w* and an equalization weight c* using an error signal $e_1[k]$ showing a difference between the reference signal d[k] and the second output signal $y_2[k]$ (step S101). In other words, the weight calculator 140 calculates not together but alternately the antenna weight w* and the equalization weight c*. Thus, the antenna weight w* does not change when the equalization weight c* is being calculated and the equalization weight c* does not change when the antenna weight w* is being calculated.

Note that at this point in time, the error signal $e_2[k]$ showing the difference between the reference signal d[k] and the first output signal $y_1[k]$ is not utilized for the calculation of the antenna weight w* and the equalization weight c* in the weight calculator 140.

When the weight calculator 140 calculates the antenna weight w* and the equalization weight c*, the determination unit 150 constantly compares the sizes of the error signal $e_1[k]$ and the error signal $e_2[k]$ as shown in the following equation (1) (step S102).

[Equation 1]

$$\rho = \frac{e_1^2[k]}{e_2^2[k]} \quad (1)$$

However, the comparison method is not limited to Equation (1). For example, calculation may be performed according to the following Equation (2) or Equation (3).

[Equation 2]

$$\rho = 10 \log \frac{e_1^2[k]}{e_2^2[k]} \quad (2)$$

[Equation 3]

$$\rho = e_1^2[k] - e_2^2[k] \quad (3)$$

A value of "$\rho$" in Equations (1) to (3) serves as an index for the improvement effect of the second signal quality with respect to the first signal quality.

At step S103, the determination unit 150 determines whether $\rho$ is equal to or smaller than a predetermined threshold $T_1$. When $\rho$ is equal to or smaller than the threshold $T_1$ (for example, $e_1^2[k] \leq T_1 e_2^2[k]$), it means that the second signal quality is improved as compared with the first signal quality by the effect of the adaptive equalizer 120. In this case, the controller 160 continues the calculation of the antenna weight w* and the equalization weight c* in the weight calculator 140 and the determination unit 150 also continues the comparison and monitoring of the error signal $e_1[k]$ and the error signal $e_2[k]$ (step S104).

The setting of the threshold $T_1$ represents a trade-off relationship between effects on a calculation amount, power consumption, and a convergence rate, and signal quality improvement made by the adaptive equalizer 120. The threshold $T_1$ can be set between 0.95 and 0.98, for example.

On the other hand, when $\rho$ exceeds the threshold $T_1$ (for example, $e_1^2[k] > T_1 e_2^2[k]$), it means that the adaptive equalizer 120 does not contribute to the improvement of the signal quality or the adaptive equalizer 120 rather deteriorates the signal quality. In this case, at step S105, the controller 160 stops the operation with regard to the adaptive equalizer 120 (the calculation of the equalization weight c* in the weight calculator 140 and the equalization calculation in the adaptive equalizer 120). At the same time, the controller 160 switches the switch SW1 from the second output signal $y_2[k]$ side to the first output signal $y_1[k]$ side. In addition, the weight calculator 140 updates only the antenna weight w* set for the adaptive array antenna 110 using the error signal $e_2[k]$.

From step S106 onwards (in other words, during the period while the operation of the adaptive equalizer 120 is being stopped), the determination unit 150 monitors changes of the error signal $e_2[k]$ (or $e_2^2[k]$). Specifically, at step S107, the determination unit 150 determines whether the error signal $e_2[k]$ (or $e_2^2[k]$) deteriorates.

Specifically, when the error signal $e_2[k]$ does not particularly change or has a tendency to be smaller (Step S107; YES), it means that the adaption to the radio communication environment can be achieved only by the adaptive array antenna 110. In this case, the controller 160 leaves the operation of the adaptive equalizer 120 stopped and causes the first output signal $y_1[k]$ to be outputted as an output signal Out (step S108).

On the other hand, when $e_2[k]$ (or $e_2^2[k]$) has a tendency to be larger during the period while the operation of the adaptive equalizer 120 is being stopped (Step S107; NO), it means that the adaption to the radio communication environment cannot be achieved only by the adaptive array antenna 110.

In this case, the controller 160 restarts the adaptive equalizer 120 and improves the signal quality of the received signal by using the adaptive array antenna 110 and the adaptive equalizer 120 together (step S109). At that time, the controller 160 also switches the switch SW1 from the first output signal $y_1[k]$ side to the second output signal $y_2[k]$ side and causes the second output signal $y_2[k]$ to be output as an output signal Out.

After that, the determination unit 150 executes the comparison processing according to Equation (1) again and repeats the above-described processes. The controller 160 monitors the repeating number k and stops the weight calculation when k reaches a predetermined number. Note that the weight calculation may be stopped when $e_1^2[k]$ or $e_2^2[k]$ is below the predetermined threshold or when a reduction amount of $e_1^2[k]$ or $e_2^2[k]$ in one calculation is below the predetermined amount.

(4) Advantageous Effects

As described above, when the improvement effect made by the adaptive equalizer 120 is equal to or smaller than the desired level, the controller 160 stops the power supply to the adaptive equalizer 120 and the calculation of the equalization weight c* in the weight calculator 140 and causes the first output signal $y_1[k]$ to be output as an output signal Out.

Accordingly, the power consumption required for the equation calculation in the adaptive equalizer 120 and the power consumption required for the calculation of the equalization weight c* in the weight calculator 140 can be reduced. Also, when the improvement effect made by the adaptive equalizer 120 exceeds the desired level, the reception processing using the adaptive array antenna 110 and the adaptive equalizer 120 together is continued, so that the signal quality of the received signal does not deteriorate.

Also, in the configuration that the adaptive equalizer 120 is serially connected to the output of the adaptive array antenna 110, the antenna weight w* and the equalization weight c* are affected with each other. Accordingly, the antenna weight w* and the equalization weight c* have to be alternately calculated. Thus, the calculation becomes complicated and a longer time is required for convergence to an optimum weight. This is attributable to the same principle as the principle in which a longer time is required for convergence as the number of the antenna elements $ANT_1$ to $ANT_R$ or taps of the adaptive equalizer 120 becomes larger. In this embodiment, when the improvement effect made by the adaptive equalizer 120 is equal to or smaller than the one desired, the controller 160 stops the calculation of the equalization weight c* in the weight calculator 140. Thus, the time required for convergence to an optimum weight can be reduced.

Moreover, in the radio communication environment without the delay wave, one of the weight values $c^*_0$ to $c^*_M$ should be "1" and all the rest should be "0". However, due to noises, the length of training sequence, the performance of the optimization algorithm, and the like, complete convergence is generally difficult. When the weight calculation is finished with incomplete convergence, the performance of the receiver 101 rather deteriorates. In this embodiment, when the improvement effect made by the adaptive equalizer 120 is equal to or smaller than the desired level, the controller 160 stops the calculation of the equalization weight c* in the weight calculator 140. Thus, the occurrence of incomplete convergence can be avoided.

As described above, according to the radio base station 100 according this embodiment, the power consumption is reduced while the signal quality of the receiving signal is preferably maintained, and at the same time the time required for convergence can be shortened and a possibility of performance deterioration due to the incomplete convergence can be reduced.

In this embodiment, the determination unit 150 determines whether the first signal quality deteriorates after the controller 160 stops the power supply. When the determination unit 150 determines that the first signal quality deteriorates, the controller 160 restarts the power supply to the adaptive equalizer 120 and the calculation of the equalization weight c* in the weight calculator 140 and causes the second output signal $y_2[k]$ to be outputted as an output signal Out.

In other words, when the operation with regard to the adaptive equalizer 120 is stopped but the adaptation to the radio communication environment cannot be achieved only by the adaptive array antenna 110, the operation related to the adaptive equalizer 120 is restarted, so that the signal quality of the received signal can be preferably maintained.

In this embodiment, the weight calculator 140 alternately calculates the antenna weight w* to improve the first signal quality and the equalization weight c* to improve the second signal quality until a predetermined condition is satisfied (for example, when the repeating time reaches a predetermined number). When the controller 160 stops the calculation of the equalization weight c* in the weight calculator 140, the weight calculator 140 only repeats the calculation of the antenna weight w* depending on the first signal quality. Consequently, the time required for convergence is further reduced and the possibility of performance deterioration due to incomplete convergence can be further reduced.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, the description is given of the case, as an example, where the adaptive array antenna 110 and the adaptive equalizer 120 are serially connected. However, this embodiment can be applied to, for example, the configuration that the adaptive array antenna 110 and a rake receiver are serially connected and a serial-type multi-stage interference cancelling. In addition, in the foregoing description, a signal showing an error from a reference signal d[k] is utilized as an evaluation index for the signal quality. This invention is not limited to this, and, for example, a desired signal-to-interference-noise ratio (SINR), a desired signal-to-noise ratio (SNR), or a carrier-to-noise ratio (CNR) can be utilized.

Figure 4:
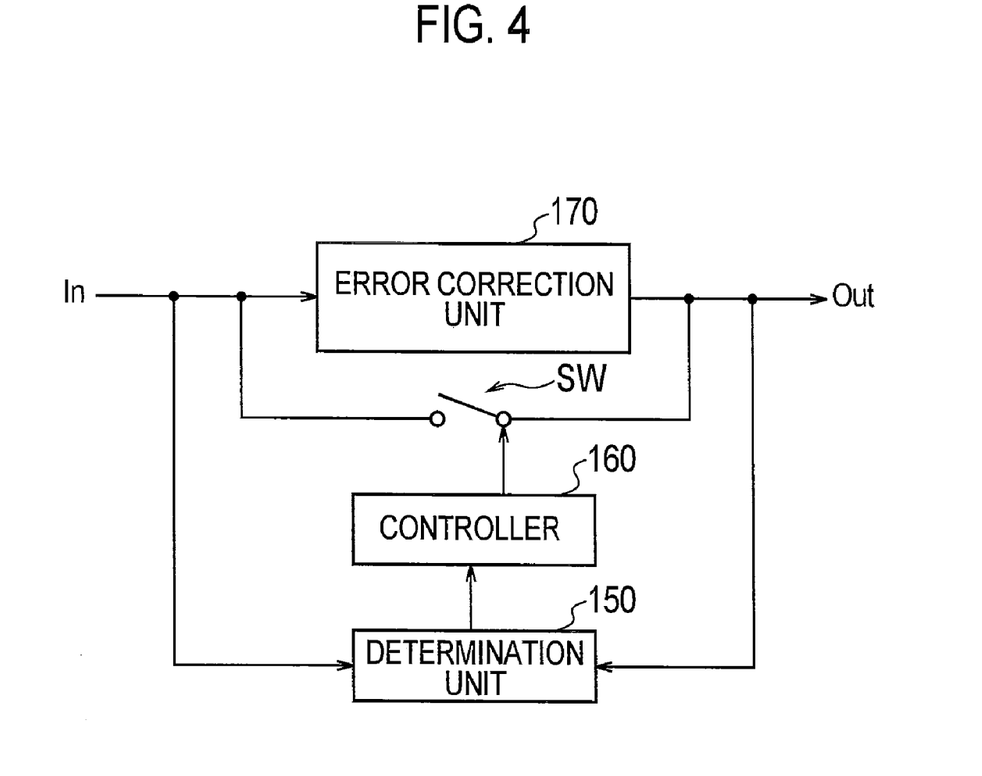
FIG. 4 is a functional block diagram showing a modification of the embodiment of the present invention.
Figure 5:
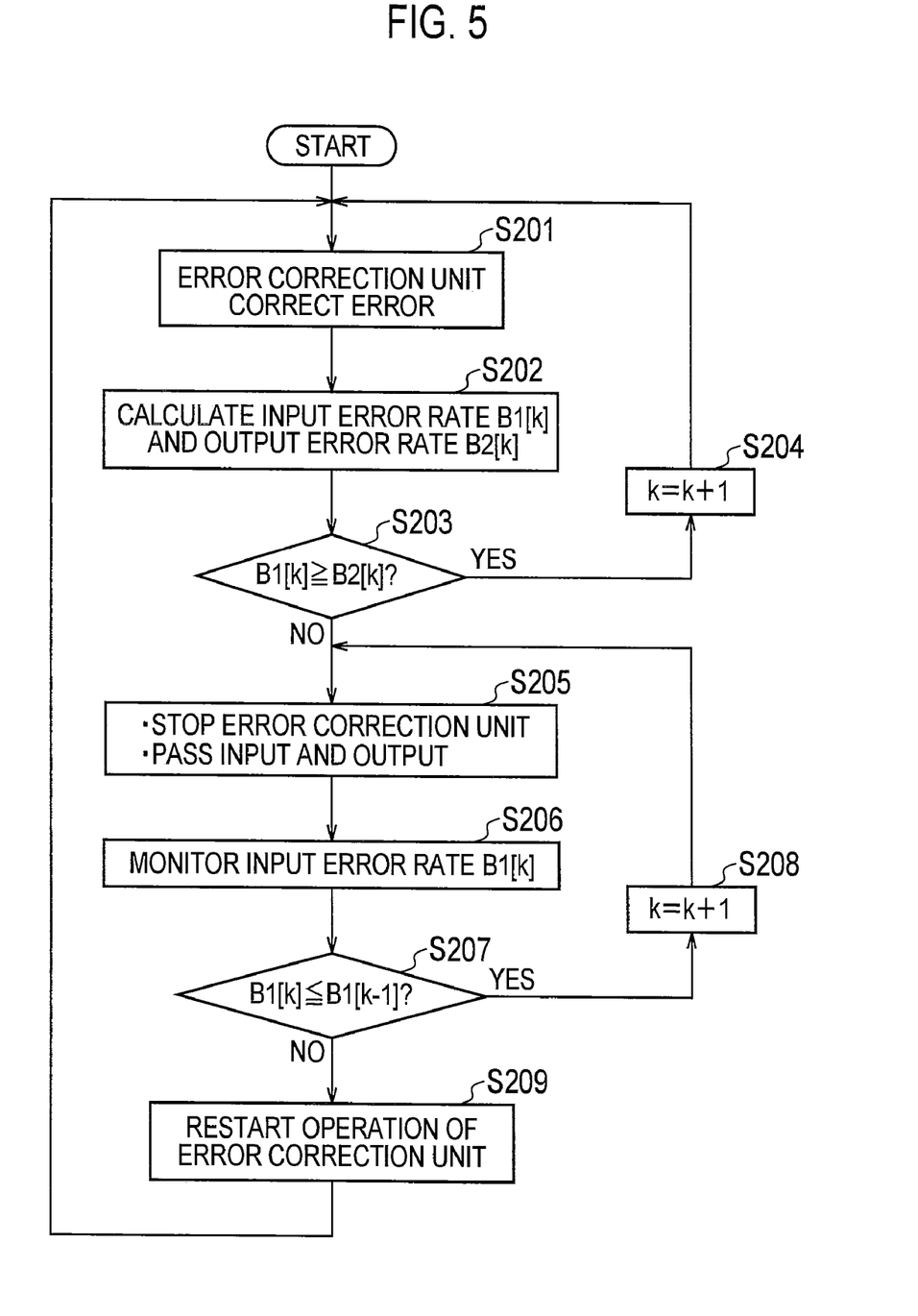
FIG. 5 is a flowchart showing the modification of the embodiment of the present invention.

Furthermore, the invention is not limited to the configuration that the adaptive array antenna 110 and the adaptive equalizer 120 are serially connected. As shown in FIG. 4, it is also possible to control the operation in one signal processing block. Now, as an example, an error correction unit 170 configured to correct a transmission error contained in an input signal In is described. The description is given to points different from the above-described embodiment. The input signal In can be used as the first output signal $y_1[k]$ in the above-described embodiment. The error correction unit 170 may utilize any type of error correction methods. FIG. 5 is a flowchart showing the operation according to this modification.

In the initial stage of the operation, the error correction unit 170 corrects an error of the input signal In and outputs an error-corrected signal as an output signal Out (step S201). A determination unit 150 calculates error rates of the respective input signal In and output signal Out (step S202). After that, the determination unit 150 compares the calculated error rates (step S203). When the error rates in the input signal In and the output signal Out are equal to each other or the error rate of the input signal In is within an allowable range, a controller 160 determines that the error correction unit 170 is unnecessary. Subsequently, the controller 160 stops the operation (the calculation) of the error correction unit 170 and passes the input signal In and the output signal Out using the switch SW. In other words, the controller 160 performs control so that the signals circumvent the error correction unit 170 (step S205). Thereafter, the determination unit 150 monitors only the error rate of the input signal In (step S206). When there is no change in the error rate of the input signal In (or when the error rate becomes further smaller), the controller 160 determines that the operation can be made without the error correction unit 170 and leaves the error correction unit 170 stopped (steps S207, S208). On the other hand, when the error rate of the input signal In tends to increase and exceeds the acceptable range, the controller 160 starts the correction error unit 170 (step S209) and the determination unit 150 compares again the respective error rates of the input signal In and the output signal Out. These processes are repeated.

In the above-described embodiment, the weight calculator 140 alternately calculates the antenna weight w* and the equalization weight c*. However, the invention is not limited to this example, but the weight calculator 140 may calculate the antenna weight w* and the equalization weight c* at the same time using the optimum algorithm.

In the above-described embodiment, the description is given of the radio base station 100 including the receiver 101, the determination unit 150, and the controller 160. However, the receiver 101, the determination unit 150, and the controller 160 may be provided in a radio terminal other than the radio base station.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2008-214019 (filed on 22 Aug. 2008) is incorporated herein by reference.

<Note>

A radio communication apparatus (for example, radio base station 100) according to another embodiment includes a receiver (receiver 101) configured to receive a radio signal containing a desired signal from a transmission side radio communication apparatus (radio terminal 200, for example) and an interference signal from an interference source (radio terminal 210, radio base station 300, for example), and a controller (controller 160) configured to control the receiver. The receiver includes an adaptive array antenna (adaptive array antenna 110) which has a plurality of antenna elements (antenna elements $ANT_1$ to $ANT_R$) and is configured to cancel the interference signal contained in the radio signal received by the antenna elements according to an antenna weight (antenna weight w* (*: a complex conjugate)), and an error correction unit (error correction unit 170) configured to correct a transmission error contained in a first output signal (input signal In) outputted by the adaptive antenna array, and a second output signal outputted by the error correction unit is outputted as an output signal (output signal Out) of the receiver. The receiver includes a determination unit (determination unit 150) configured to compare a first signal quality of the first output signal with a second signal quality of the second output signal to determine whether an improvement effect of the second signal quality with respect to the first signal quality is equal to or smaller than a desired level. When the determination unit determines that the improvement effect is equal to or smaller than the desired level, the controller stops power supply to the error correction unit and causes the first output signal to be outputted as the output signal of the receiver.

Industrial Applicability

As described above, in a case where a receiver having the configuration that an adaptive array antenna and an adaptive equalizer are serially connected is used, a radio communication apparatus and a control method according to the present invention can reduce power consumption of the receiver and easily and properly calculate weights without deteriorating the signal quality of radio signals which are received by the receiver, thereby being effective in radio communications for mobile communications.

The invention claimed is:

1. A radio communication apparatus comprising:
a receiver configured to receive a radio signal containing a desired signal from a transmission side radio communication apparatus and an interference signal from an interference source; and
a controller configured to control the receiver, wherein
the receiver comprises:
an adaptive array antenna which has a plurality of antenna elements and is configured to cancel the interference signal contained in the radio signal received by the antenna elements according to an antenna weight,
an adaptive equalizer configured to combine an advancing wave component and a delay wave component, which are contained in a first output signal outputted from the adaptive array antenna, according to an equalization weight, the delay wave component delayed from the advancing wave component, and
a weight calculator configured to calculate the antenna weight set in the adaptive array antenna and the equalization weight set in the adaptive equalizer, wherein
a second output signal outputted by the adaptive equalizer is outputted as an output signal of the receiver,
the radio communication apparatus further comprising:
a determination unit configured to compare a first signal quality of the first output signal with a second signal quality of the second output signal to determine whether an improvement effect of the second signal quality with respect to the first signal quality is equal to or smaller than a desired level, wherein
when the determination unit determines that the improvement effect is equal to or smaller than the desired level, the controller stops power supply to the adaptive equalizer and calculation of the equalization weight in the weight calculator and causes the first output signal to be outputted as the output signal of the receiver.

2. The radio communication apparatus according to claim 1, wherein
the determination unit determines whether the first signal quality deteriorates after the controller stops the power supply, and
when the determination unit determines that the first signal quality deteriorates, the controller restarts the power supply and the calculation of the equalization weight in the weight calculator and causes the second output signal to be outputted as the output signal of the receiver.

3. The radio communication apparatus according to claim 1, wherein
the weight calculator alternately calculates the antenna weight to improve the first signal quality and the equalization weight to improve the second signal quality, and
when the controller stops the calculation of the equalization weight in the weight calculator, the weight calculator only repeats the calculation of the antenna weight depending on the first signal quality.

4. The radio communication apparatus according to claim 1 further comprising:
an error calculator configured to calculate a first error between the first output signal and a reference signal set in advance, and a second error between the second output signal and the reference signal, wherein
the first signal quality is a value based on the first error and the second signal quality is a value based on the second error.

5. The radio communication apparatus according to claim 1, wherein
the receiver includes an output selector configured to select any one of the first output signal and the second output signal as the output signal of the receiver,
the output selector selects the second output signal as the output signal of the receiver in an initial state, and
when the determination unit determines that the improvement effect is equal to or smaller than the desired level, the controller causes the output selector to select the first output signal as the output signal of the receiver.

6. A radio communication apparatus comprising:
a receiver configured to receive a radio signal containing a desired signal from a transmission side radio communication apparatus and an interference signal from an interference source; and
a controller configured to control the receiver, wherein
the receiver comprises:
an adaptive array antenna which has a plurality of antenna elements and is configured to cancel the interference signal contained in the radio signal received by the antenna elements according to an antenna weight, and
an error correction unit configured to correct a transmission error contained in a first output signal outputted by the adaptive antenna array, wherein
a second output signal outputted by the error correction unit is outputted as an output signal of the receiver,
the radio communication apparatus further comprising:
a determination unit configured to compare a first signal quality of the first output signal with a second signal quality of the second output signal to determine whether an improvement effect of the second signal quality with respect to the first signal quality is equal to or smaller than a desired level, wherein
when the determination unit determines that the improvement effect is equal to or smaller than the desired level, the controller stops power supply to the error correction unit and causes the first output signal to be outputted as the output signal of the receiver.

7. A control method for a radio communication apparatus including:
a receiver configured to receive a radio signal containing a desired signal from a transmission side radio communication apparatus and an interference signal from an interference source, in which
the receiver includes:
an adaptive array antenna which has a plurality of antenna elements and is configured to cancel the interference signal contained in the radio signal received by the antenna elements according to an antenna weight,
an adaptive equalizer configured to combine an advancing wave component and a delay wave component, which are contained in a first output signal outputted from the adaptive array antenna, according to an equalization weight, the delay wave component delayed from the advancing wave component, and a weight calculator configured to calculate the antenna weight set in the adaptive array antenna and the equalization weight set in the adaptive equalizer, and a second output signal outputted by the adaptive equalizer is outputted as an output signal of the receiver, the control method comprising the steps of:

determining whether an improvement effect of the second signal quality with respect to the first signal quality is equal to or smaller than a desired level by comparing a first signal quality of the first output signal with a second signal quality of the second output signal; and stopping power supply to the adaptive equalizer and calculation of the equalization weight in the weight calculator and causing the first output signal to be outputted as the output signal of the receiver when the improvement effect is determined to be equal to or smaller than the desired level in the determining.

* * * * *